United States Patent
Lim

(10) Patent No.: US 10,374,874 B2
(45) Date of Patent: Aug. 6, 2019

(54) REDUCING DATA PLANE DISRUPTION IN A VIRTUAL SWITCH

(71) Applicant: Nicira, Inc., Palo Alto, CA (US)

(72) Inventor: Harold Vinson C. Lim, Union City, CA (US)

(73) Assignee: Nicira, Inc., Palo Alto, CA (US)

( * ) Notice: Subject to any disclaimer, the term of this patent is extended or adjusted under 35 U.S.C. 154(b) by 252 days.

(21) Appl. No.: 15/296,612

(22) Filed: Oct. 18, 2016

(65) Prior Publication Data

US 2018/0109416 A1     Apr. 19, 2018

(51) Int. Cl.
  *H04L 12/00*  (2006.01)
  *H04L 12/24*  (2006.01)
  *H04L 12/931* (2013.01)

(52) U.S. Cl.
  CPC .......... *H04L 41/0806* (2013.01); *H04L 49/70* (2013.01)

(58) Field of Classification Search
  CPC ..... H04L 12/44; H04L 49/70; H04L 41/0806; H04L 67/34
  USPC ....................................................... 709/226
  See application file for complete search history.

(56) References Cited

U.S. PATENT DOCUMENTS

| | | | |
|---|---|---|---|
| 7,356,677 B1* | 4/2008 | Rafizadeh | G06F 9/4418 713/1 |
| 7,669,186 B2* | 2/2010 | Nolan | G06F 11/362 717/124 |
| 9,430,264 B2* | 8/2016 | Tang | G06F 9/45545 |
| 9,990,170 B2* | 6/2018 | Kumar | G06F 9/45558 |
| 2002/0161961 A1* | 10/2002 | Hardin | G06F 9/4812 711/6 |
| 2008/0019316 A1* | 1/2008 | Imai | G06F 11/2025 370/331 |
| 2009/0100496 A1* | 4/2009 | Bechtolsheim | H04N 7/17336 725/147 |
| 2013/0155083 A1* | 6/2013 | McKenzie | G06T 1/20 345/522 |
| 2014/0082619 A1* | 3/2014 | Yoshida | G06F 11/1484 718/1 |
| 2014/0137109 A1* | 5/2014 | Sharma | H04L 49/70 718/1 |
| 2015/0372862 A1* | 12/2015 | Namihira | H04L 12/44 370/254 |

\* cited by examiner

*Primary Examiner* — Frantz Coby

(57) ABSTRACT

Described herein are systems, methods, and software to reduce data plane disruption during a startup event for a virtual switch controller. In one example, during a startup event, applications are initiated on a virtual switch controller to configure the virtual switch. Once initiated, an application, which depends on one or more other applications, may hold configuration operations until notifications are received from the one or more other applications operating on the virtual switch controller. Once the notifications are received, the application may resume the required configuration operations.

20 Claims, 8 Drawing Sheets

CONTROLLER DEPENDENCY TABLE
500

| APPLICATIONS 510 | DEPENDENCIES 520 | | |
|---|---|---|---|
| APPLICATION A 540 | APPLICATION B 542 | | |
| APPLICATION B 541 | APPLICATION C 542 | | |
| APPLICATION C 542 | | | |

| APPLICATION D 543 | APPLICATION A 540 | APPLICATION B 541 | APPLICATION C 542 |

REDUCING DATA PLANE DISRUPTION IN A VIRTUAL SWITCH

TECHNICAL BACKGROUND

In computing environments, virtual switches may be used that comprise software modules capable of providing a communication platform for one or more virtual nodes in the computing environment. These virtual switches may be used to intelligently direct communication on the network by inspecting packets before passing them to other nodes on the same network. For example, packets may be inspected to determine the source and destination internet protocol (IP) addresses to determine if the communication is permitted to be delivered to the destination computing node. In some implementations, virtual switches may be configured with flow processes that can include one or more flow operations, or tables, that define rules and actions to be taken against a packet. These flow operations identify specific attributes, such as IP addresses, media access control (MAC) addresses, and the like, within the data packet and, when identified, provide a set of actions to be asserted against the data packet. These actions may include modifications to the data packet, forwarding rules for the data packet, amongst other possible operations.

To manage the virtual switches, a virtual switch controller may be provided that is used to separate the control plane from the data plane of a computing network. These virtual switch controllers are used to define rules, or control mechanisms that direct a packet when it is received by the virtual switch. In some implementations, this routing may include defining which nodes are part of which networks, which security mechanisms are to be placed on communicating packets, or some other control mechanism with respect to the data plane of the virtual switch.

Although the virtual switch controllers are responsible for configuring the data plane forwarding on the virtual switch, difficulties often arise when the controller is initially started or rebooted. In particular, the controller often must identify characteristics of the current configuration for a virtual switch, and the corresponding virtual nodes connected thereto, before new configuration parameters may be passed to the virtual switch. However, difficulties arise as different characteristics of the current switch configuration may be identified at different times. This can lead to the controller improperly identifying a configuration for the switch, or waiting an unnecessary length of time to identify the current configuration of the switch.

OVERVIEW

The technology disclosed herein enhances the ability of a virtual switch controller to limit disruption of the data plane in the corresponding virtual switch. In an implementation, a method of operating a virtual switch controller to configure a virtual switch includes initiating a plurality of applications to configure the virtual switch for a plurality of computing nodes. The method further provides, in a first application of the plurality of applications, pausing execution of the first application until one or more completion notifications are received from one or more other applications in the plurality of applications. The method also provides, in the first application, receiving the one or more completion notifications, and in response to receiving the one or more completion notifications, resuming the first application to configure the virtual switch for the plurality of computing nodes.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 5 illustrates a dependency table of configuration applications on a virtual switch controller according to an implementation.

DETAILED DESCRIPTION

Figure 1:
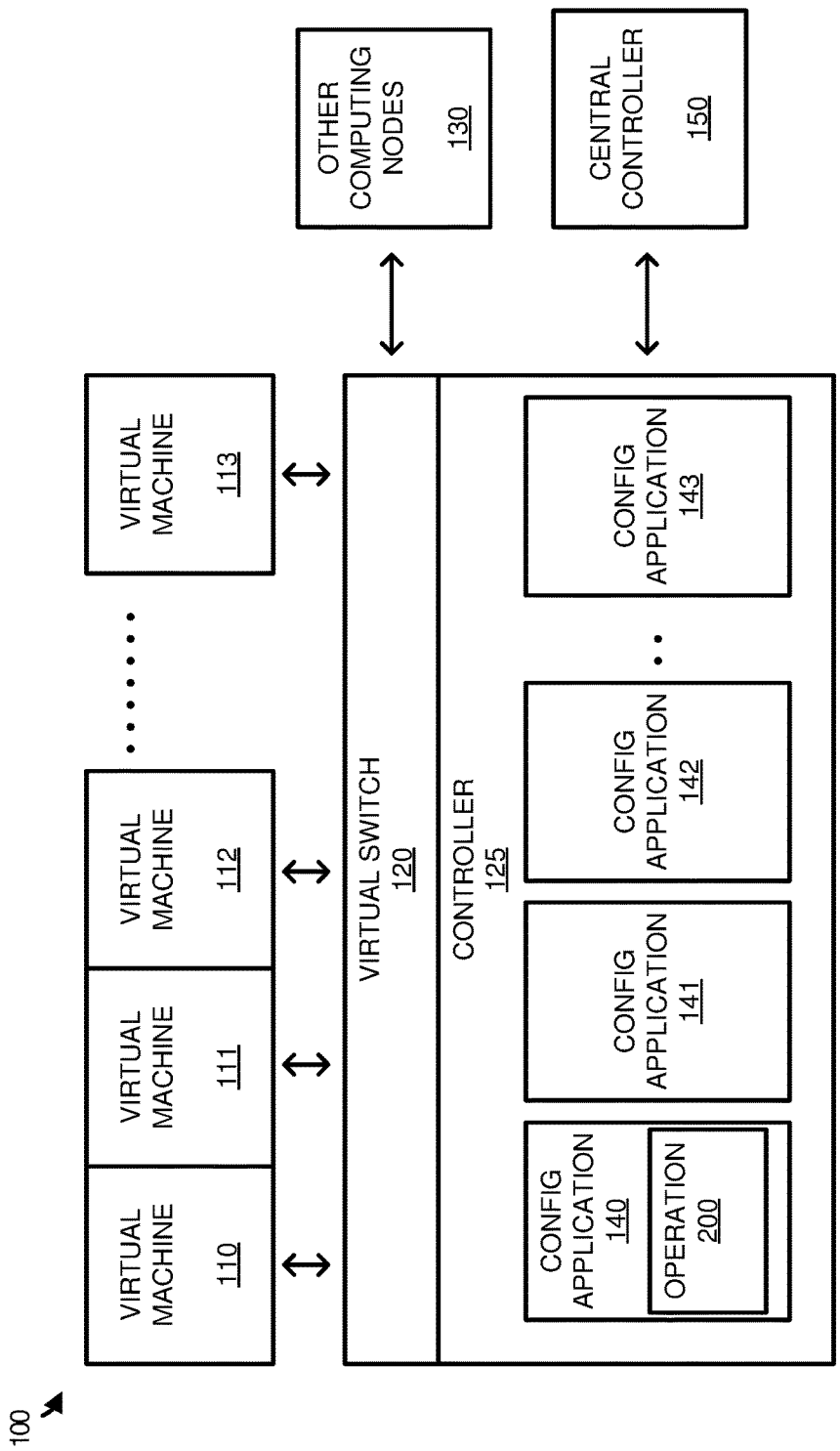
FIG. 1 illustrates a computing environment to reduce data plane disruption in a virtual switch according to an implementation.

The various examples disclosed herein provide enhancements for minimizing data plane disruptions during a startup of a virtual switch controller. In particular, virtual switch controllers may be used to separate the control plane from the data plane of a computing network. These virtual controllers may be used to define rules, or control mechanisms, that direct a packet to destination computing nodes when a packet is received by the virtual switch. These rules and control mechanisms may include defining logical switches and routers within the virtual switches and programming the flow processes or flow tables that are used in the routing of packets as they are received.

Here, when a virtual switch controller is initiated, which may occur at startup or during a restart of the virtual switch controller, various applications are required in performing startup operations to properly configure the data plane. These applications (or components) may include a configuration application that is responsible for configurations of routers and switches, a layer 2 application that is responsible for the layer 2 run-time state, such as logical media access control (MAC) address to hypervisor mapping, a flow integration application that is responsible for monitoring and managing the flows that are installed in the virtual switch, among other applications. Each of these applications may be required to identify a current state for the virtual switch before any configuration can be provided to the virtual switch. This state information may include identifying the switches and routers that are currently implemented in the data plane configuration, the current virtual machines logically connected to the routers and switches, or any other similar configuration information. Once the current state information is identified, any changes to the configuration may be implemented by the controller, wherein the changes can be in the form of adding, modifying, or removing flow operations for the virtual switch.

In the present implementation, to ensure that no changes are made in the data plane configuration prior to determining a current configuration for a virtual switch, notifications are used between dependent applications. In one example, in response to a startup or restart event, the applications on a virtual switch controller may be initiated. Once initiated, each of the applications may hold or otherwise be prevented from completing their operations until a notification is received from each other application from which it depends. For example, a master configuration application may wait until all other applications have retrieved and identified the current state of the virtual switch. Once all of the applications have reported that their operations are complete, then the master configuration application may continue operation and implement a configuration with the virtual switch. This configuration may include adding, removing, modifying, or any other similar operation with respect to the flow operations or tables of the virtual switch. In another example, an application may comprise a layer 2 application that requires information from both a configuration application, which provides a list of switches and routers, as well as layer 3 application, which can define IP addressing associated with the network. The layer 2 application may use the information determined from the configuration application and the layer 3 application in determining a current layer 2 configuration for the virtual switch.

In at least one example, each of the applications on the virtual switch controller may be responsible for notifying other applications of the dependency requirement. As a result, when the applications on the virtual switch controller are initiated, each of the applications may transfer notifications to any applications from which they depend. Once registered with other applications, the applications may supply a completion notification to indicate the completion of their assigned operation. For example, a master configuration application may register as dependent on all other applications executing on the virtual switch controller to ensure that all other applications are completed prior to implementing changes to the data plane with the virtual switch.

FIG. 1 illustrates a computing environment 100 to reduce data plane disruption in a virtual switch according to an implementation. Computing environment 100 includes virtual machines 110-113, virtual switch 120, controller 125, other computing nodes 130 and central controller 150. Controller 125, which is representative of a local controller for virtual switch 120, includes configuration (config) applications 140-143 that are used in the configuration process of virtual switch during a startup event for controller 125. Virtual machines 110-113 and virtual switch 120 may execute on a host computing system, such as a server computing system, desktop computing system, or the like. Controller 125 may execute on the same computing system as virtual machines 110-113 and virtual switch 120, or may execute a separate computing system, such as server computing system, desktop computing system, and the like. Other computing nodes 130, which may be omitted in some examples, may comprise other physical or virtual systems capable of communicating with virtual switch 120 via a communication interface, such as a physical network interface controller. Central controller 150 may execute on one or more computing systems, such as servers, desktop computing systems, and the like, and may execute on the same computing system as virtual machines 110-113 and controller 125 in some examples.

In operation, virtual switch 120 executes to provide communication services for virtual machines 110-113. To provide the communication services, virtual switch 120 may intelligently direct communication on the network by inspecting the packets before forwarding the packets over the network to other virtual machines and computing nodes. This directing of packets may forward packets over a physical network, or may direct packets to other virtual machines on the same host without forwarding them over a physical network. To provide the inspection of the packets received by virtual switch 120, flow operations (or flow tables) may be defined that permit the virtual switch to quickly identify attributes of the packets, and provide operations based on the attributes of the packets. For example, the flow may be used to commit particular actions against packets with a defined source internet protocol (IP), wherein the source IP address may be defined in a header of the particular packet. In some implementations, the flow operations may be updated based on information that is provided from controller 125. For example, if a packet is received by virtual switch 120 that cannot be processed by the flow operations currently available to the virtual switch, controller 125 may be used to provide a new flow operation that can be used for the next packet that is received with the same attributes.

Here, controller 125 is provided with configuration applications 140-143, which may be used in identifying a current data plane configuration for virtual switch 120 and implementing any required changes defined by central controller 150. These configuration applications may include a configuration application that is responsible for configurations of routers and switches, a layer 2 application that is responsible for the layer 2 run time state, such as logical media access control (MAC) address to hypervisor mapping, a flow integration application that is responsible for monitoring and managing the flows that are installed in the virtual switch, among other applications. These applications may have dependencies, wherein one application, such as configuration application 140, may depend on operations being completed by one or more other configuration applications. For example, a layer 2 application may require information from both a configuration application, which provides a list of switches and routers, as well as layer 3 application, which can define IP addressing associated with the network.

Figure 2:
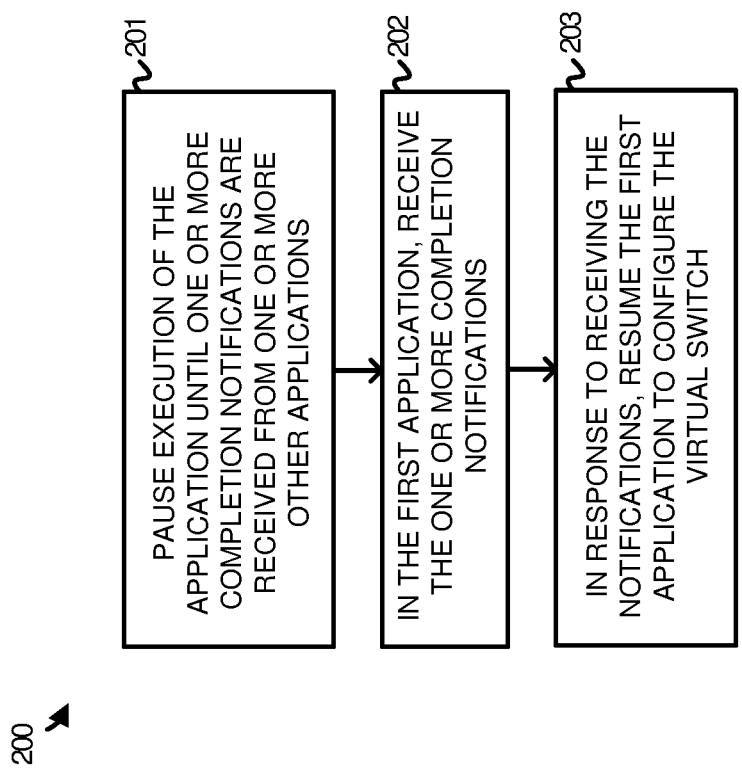
FIG. 2 illustrates an operation of a configuration application to configure a data plane of a virtual switch according to an implementation.

FIG. 2 illustrates an operation 200 of a configuration application to configure a data plane of a virtual switch according to an implementation. The operations in FIG. 2 are referenced parenthetically in the paragraphs that follow with reference to systems and objects of computing environment 100 of FIG. 1. In particular, the operations of FIG. 2 are described with respect to configuration application 140, however, it should be understood that similar operations may be executed by configuration applications 141-143.

As described in FIG. 1, in response to a startup event for controller 125, a plurality of applications may be initiated on controller 125 that are used in configuring virtual switch 120. Once the applications are initiated, application 140 is paused (201) until one or more completion notifications are received from one or more other applications executing on controller 125. This pause may be used to ensure that all dependent information is gathered for the application before the application can complete its operation. For example, a layer 2 application may require information from a layer 3 application before continuing its configuration operations. In particular, the layer 2 application may require layer 3 addressing information for nodes of the computing network before it can determine a layer 2 state of the computing network. In some examples, the pausing of the application may occur prior to any operations being completed for configuration application 140, however, in other examples, configuration application 140 may complete at least a portion of its operations prior to pausing and waiting for notifications.

As the one or more applications complete their operations, the one or more applications may transfer completion notifications to configuration application 140, wherein application 140 is configured to receive (202) the one or more completion notifications. In response to receiving the one or more completion notifications, configuration application 140 may resume (203) operations to configure virtual switch 120.

In some implementations, when configuration application 140 is initiated on controller 125, application 140 may notify, or register with, one or more other applications that it dependent on for proper operation. In particular, a developer of configuration application 140 may define a list of applications that should complete operation before configuration application 140 is permitted to complete its own operation. Once the application is registered with the one or more applications, application 140 may pause or hold its configuration operation until notifications are received from applications that it has registered with. Once the notifications are received, configuration application 140 may continue the configuration operation. In some implementations, in addition to registering with other applications, other applications may also register with application 140. As a result, when application 140 completes its configuration operation, it may transfer a completion notification to the applications that registered with application 140.

Although illustrated in the example of computing environment 100 of FIG. 1 with four applications executing on controller 125, it should be understood that any number of applications may execute on controller 125. These applications may be responsible for identifying a current configuration of virtual switch 120 (switches, routers, IP addresses, MAC addresses, virtual local area networks (VLANs), and the like currently implemented on virtual switch 120), as well as identifying a new configuration for virtual switch 120 based on information from central controller 150.

Figure 3:
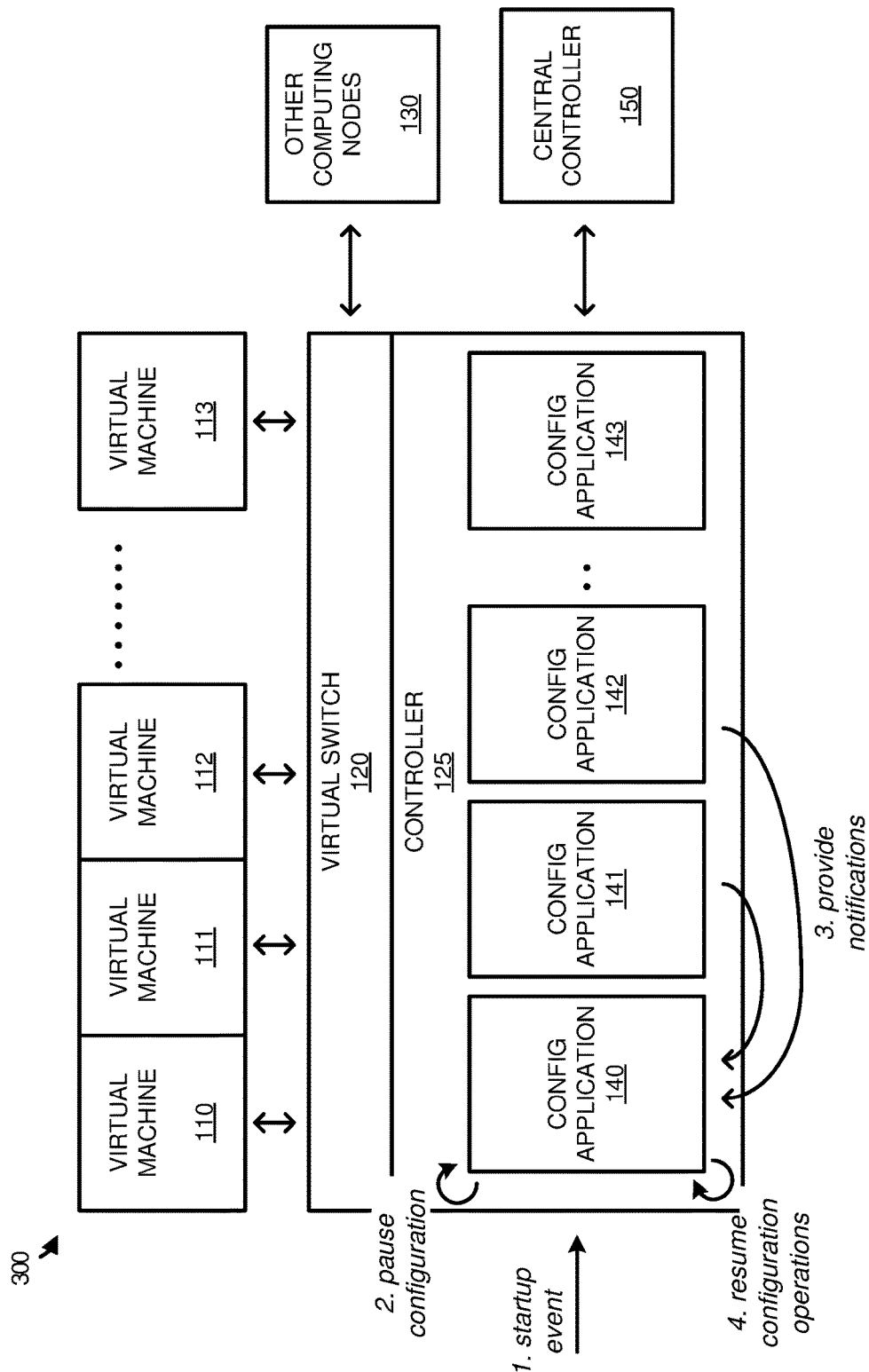
FIG. 3 illustrates an operational scenario of configuring a data plane of a virtual switch according to an implementation.

FIG. 3 illustrates an operational scenario 300 of configuring a data plane of a virtual switch according to an implementation. Operational scenario 300 includes systems and elements from computing environment 100 of FIG. 1. Operational scenario 300 provides an example of dependency operations with regards to configuration application 140, however, it should be understood that similar operations may be used by configuration applications 141-143.

As depicted, at step 1, a startup event occurs for controller 125, wherein the startup event may comprise a restart in some implementations. In response to the startup event, a plurality of applications 140-143 is initiated on the controller, which are used in determining a configuration for the data plane on virtual switch 120. In particular, the applications may be responsible for identifying current configuration information for virtual switch 120, as well as determining a new configuration for virtual switch 120 via information from central controller 150. In some implementations, central controller 150 may comprise a controller that manages virtual switch configurations across a plurality of host computing systems, and can manage the migration, addition, deletion, and other operations with respect to virtual machines over the plurality of host systems.

Once the applications are initiated for controller 125, configuration application 140, at step 2, pauses its configuration operations until completion notifications are received from other configuration applications executing for controller 125. This pausing of the configuration operations ensures that all dependencies for configuration application 140 have completed prior to configuration application 140 completing its operation. For example, if configuration application 140 were a layer 2 application, the layer 2 application may be required to receive completion notifications from a layer 3 application and a configuration application, wherein the configuration application may be responsible for determining the list of switches and routers that are required to be connected for virtual machines 110-113, and wherein the layer 3 application may be responsible for determining the layer 3 configuration information for switch 120, which may comprise logical layer 3 configurations required to be implemented by virtual switch 120 to span the routing domain for the virtual machines it is servicing.

Here, once configuration applications 141 and 142 complete their operations, they may transfer a notification to configuration application 140, at step 3. Based on the completion notifications, configuration application 140 may resume, at step 4, configuration operations. Referring back to the example of a layer 2 application being dependent on the operations of a layer 3 and a configuration application, when the layer 2 application receives the notification from the configuration and the layer 3 application, the layer 2 application may identify the required logical MAC to hypervisor or switch mapping. This determination may be based, at least in part on the information that was obtained using the other applications. Specifically, the layer 2 application may be incapable of determining which switches need to be "joined" in virtual switch 120 without determining the overall list of switches and routers, as well as information about the routers from the layer 3 application. By waiting for the notifications from the other applications, it ensures that each application receives their required dependency information before completing their operation.

In some implementations, another configuration application may depend on configuration application 140. As a result, when configuration application 140 determines its required information, it may notify another application, such as configuration application 143, that the configuration operations are complete. Based on the completion notification, as well as any other required notifications from applications executing on controller 125, configuration application 143 may resume its configuration operation.

Figure 4:
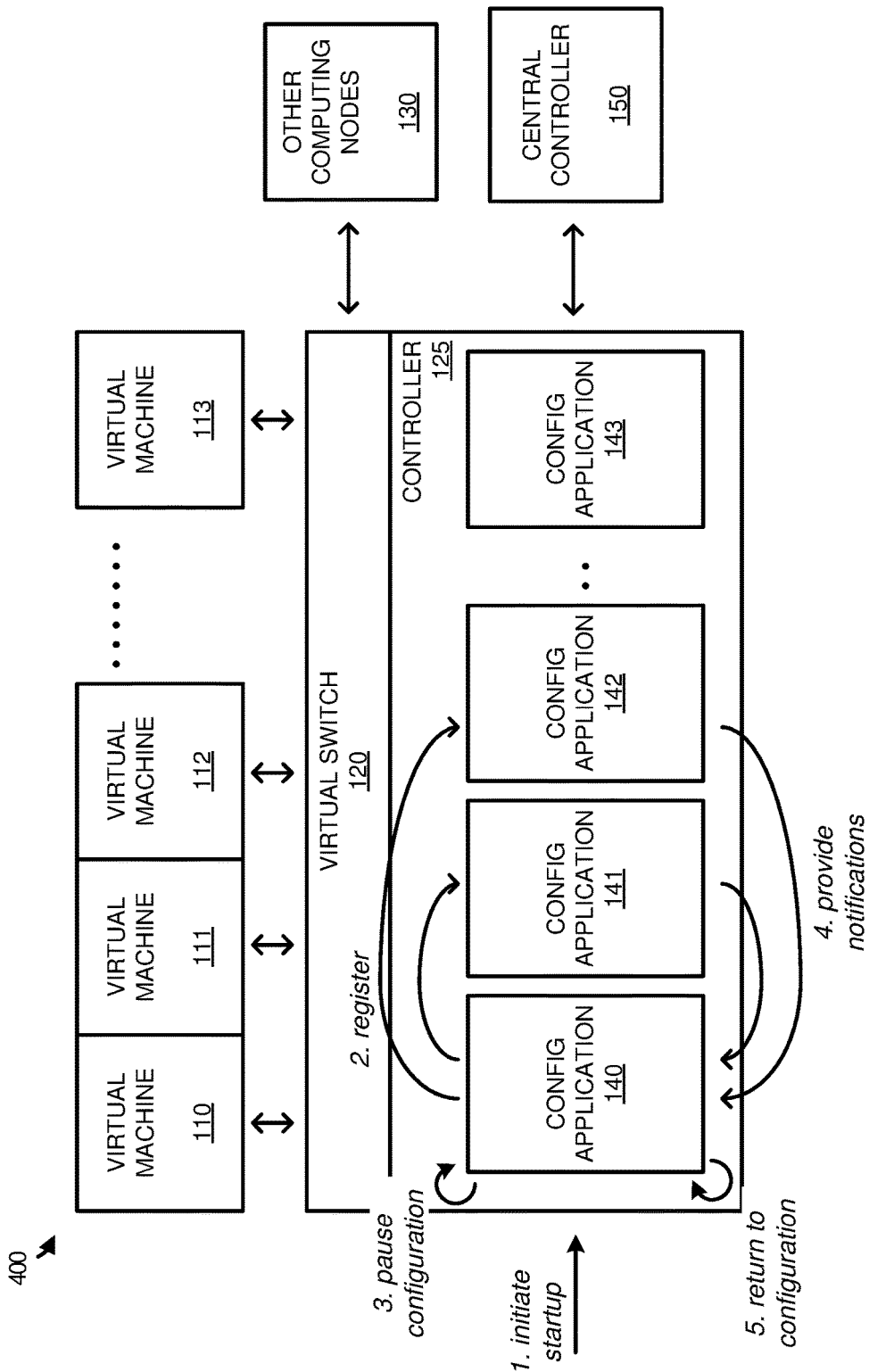
FIG. 4 illustrates an operational scenario of configuring a data plane of a virtual switch according to an implementation.

FIG. 4 illustrates an operational scenario 400 of configuring a data plane of a virtual switch according to an implementation. Operational scenario 400 includes systems and elements from computing environment 100 of FIG. 1. Operational scenario 400 provides an example of dependency operations with regards to configuration application 140, however, it should be understood that similar operations may be used by configuration applications 141-143.

Similar to the operations illustrated in operational scenario 400 of FIG. 4, operational scenario 500, at step 1, identifies a startup event for control 125, wherein the startup event may comprise a restart in some implementations. In response to the startup event, a plurality of applications 140-143 is initiated on controller 125, which are used in determining a configuration for the data plane on virtual switch 120. In particular the applications may be responsible for identifying current configuration information for virtual switch 120, as well as determining a new configuration for virtual switch 120 via information from central controller 150. In some implementations, central controller 150 may comprise a controller that manages virtual switch configurations across a plurality of host computing systems, and can manage the migration, addition, deletion, and other operations with respect to virtual machines over the plurality of host systems.

Once the applications are initiated for controller 125, configuration application 140 transfers, at step 2, a registration notification to configuration applications 141-142 to indicate to configuration applications 141-142 that it is dependent on their operations. This registration notifies the configuration applications to transfer a completion notification to configuration application 140 when they complete their operations. In particular, by notifying configuration application 140 of their completion this may ensure that configuration application 140 and controller 125 has received all of the required dependencies to determine the required information by configuration application 140. For example, configuration application 140 may be used to determine, which switches are required to be "joined" or connected for virtual switch 120. Consequently, configuration application 140 may be required to wait for a list of switches and routers, as well as a router configuration from configuration applications 141-142, before it can determine a switch configuration to be applied to virtual switch 120.

Once configuration application 140 registers with configuration applications 141-142, configuration application 140 may pause its configuration operations, at step 3, and wait for the required completion notifications. This pause may occur prior to any configuration operations being processed by configuration application 140, or may occur after a portion of the configuration operations are performed by configuration application 140. As the processes on configuration applications 141-142 are completed, each of the applications may transfer, at step 4, a completion notification message to configuration application 140 indicating that processes associated with the configuration application have been completed. Once notified, configuration application 140 may resume, at step 5, its configuration operation to configure virtual switch 120, wherein at least a portion of the operations may be based on information determined by configuration applications 141-142.

In some implementations, another configuration application may depend on configuration application 140. For example, configuration application 143 may register with configuration application 140 indicating that that configuration application 143 is dependent on the operations of configuration application 140. Once configuration application 140 completes its required operations, configuration application 140 may notify configuration application 143 that the configuration operations are complete. Based on the completion notification, as well as any other required notifications from applications executing on controller 125, configuration application 143 may resume its configuration operation.

FIG. 5 illustrates a dependency table 500 of configuration applications on a virtual switch controller according to an implementation. Dependency table 500 includes applications 510 and dependencies 520. Dependency table 500 is an illustrative example of the dependencies between applications on a virtual switch controller, however, it should be understood that applications may only be required to identify and register with applications with which they depend.

As depicted, applications 540-541 and 543 are dependent on the operations of at least one other application operating on the virtual switch. In particular, application B 541 is dependent on application C 542, application A 540 is dependent on application B 542, and application D 543 is dependent on applications A, B, and C 540-542. During the initiation of the virtual switch controller, each application in the plurality of applications 540-543 may provide registration notifications to the other applications from which they depend. This registration notifies the other applications to transfer a completion notification after completing their application operation. Prior to receiving the completion notification, the applications that register with the other applications may hold or pause their configuration operations until the notification is received.

Accordingly, when application C 542 completes operations on the virtual switch controller it may transfer a notification to application B 541 and application D 543. In response to receiving the completion notification, application B 541 may resume the configuration operations, while application D 543 may wait for notifications from application A and B 540-541. Once application B 541 completes its configuration operations, application B 541 may transfer a notification to application A 540 and application D 543. In turn, application A 540 may, based on receiving the notification complete its operation and notify application D543. Once application D 543 receives notifications from all of applications 541-543, application D 543 may complete its configuration operation.

In at least an implementation, application D 543 may be representative of a data plane master configuration application that requires the completion of all other applications before executing its operation. In particular, application D 543 may be required to wait for other applications to determine the switching and routing configurations currently executing on the virtual switch and compare the configuration to a run-time configuration provided from a central controller to determine any changes to be made to the data plane. Once the changes are identified, which may comprise the addition, deletion, or modification to flow operations (flow tables) on the virtual switch, the data plane modifications may be implemented. In at least one example, the run-time configuration provided from the central controller may comprise a run-time configuration for the overall routing and switching plane of the network spread across multiple virtual switches. Consequently, the run-time configuration may need to be processed to determine the run-time configuration (flow operations) that apply to the local virtual switch. Once processed, the run-time configuration may be implemented.

Figure 6:
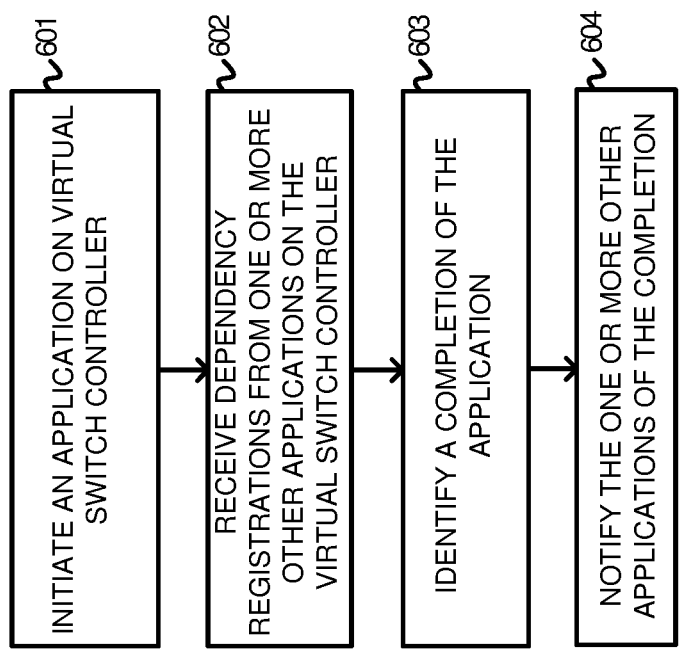
FIG. 6 illustrates an operation of a configuration application according to an implementation.

FIG. 6 illustrates an operation of a configuration application according to an implementation. FIG. 6 is representative of an operation of an application to notify other applications on a virtual switch controller of a completion in the configuration process of the application. The operations of FIG. 6 are referenced parenthetically in the paragraphs that follow.

As depicted in FIG. 6, the operation includes initiating (601) an application on a virtual switch controller in response to a startup event. This startup event may comprise a power on or a restart of the virtual switch in some examples. Once initiated, the application receives (602)

dependency registrations from one or more other applications on the virtual switch controller. These dependency registrations permit other application to notify the application that they require configuration information from the application. This configuration information may include a list of switches and routers currently implemented in the network, connectivity information for each of the switches and routers, or any other similar configuration information.

After receiving the registrations from the one or more other applications, the application further identifies (603) a completion in the operations of the application, and notifies (604) the one or more other applications of the completion. For example, a layer 3 application may be configured to notify a layer 2 application that the router state or configuration has been calculated before the switch state can be calculated for the virtual switch. Once the layer 3 application has completed its state calculation, it may notify the layer 2 application, wherein the layer 2 application may rely on information determined from the layer 3 application.

Figure 7:
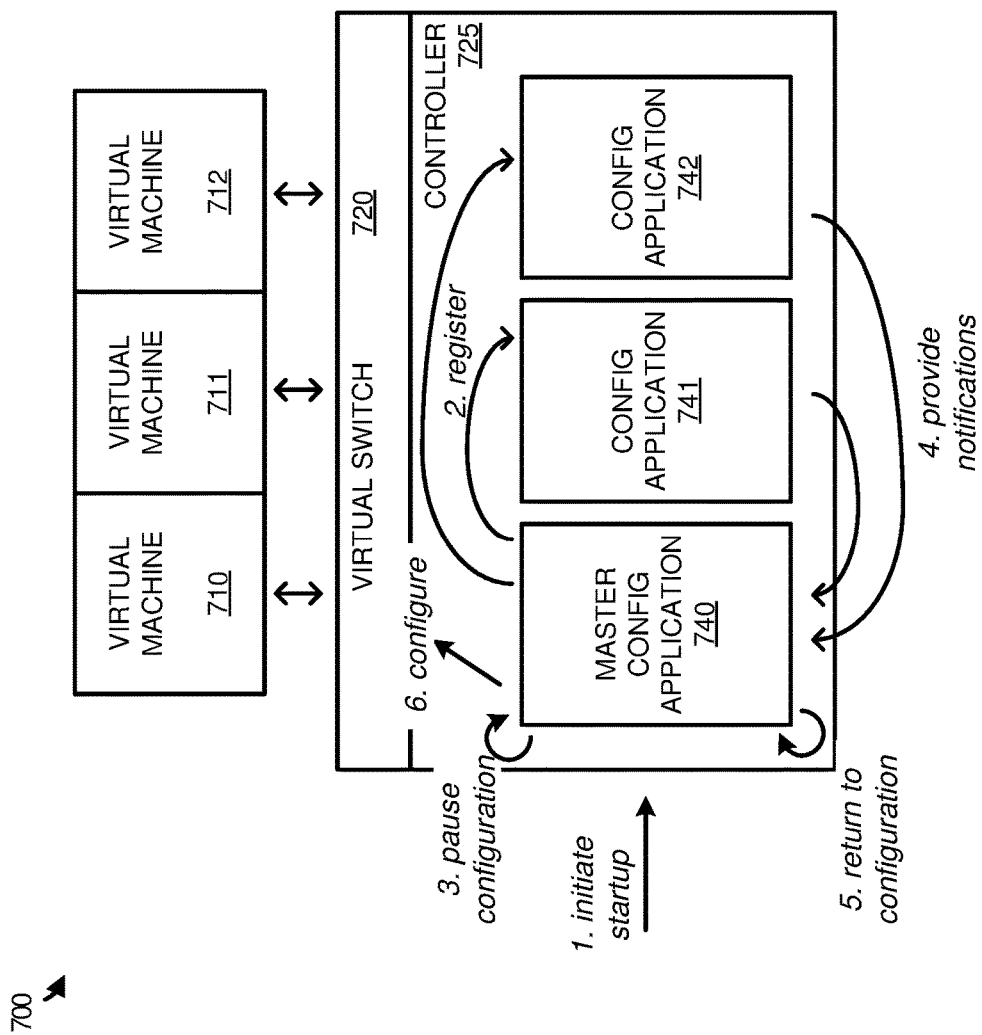
FIG. 7 illustrates an operational scenario of operating a master configuration application according to an implementation.

FIG. 7 illustrates an operational scenario 700 of operating a master configuration application according to an implementation. Operational scenario 700 includes virtual machines 710-712 logically coupled to virtual switch 720. Virtual switch 720 is configured via controller 725, wherein controller 725 may comprise a local controller in some implementations capable of communicating with a central controller responsible for a plurality of local controllers in a computing network. Controller 725 includes master configuration application 740 and configuration applications 741-742, wherein configuration applications 741-742 may be responsible for identifying current local switch configurations, router configurations, or any other similar configuration related information corresponding to virtual switch 720.

In operation, at step 1, a startup event occurs for controller 725, wherein the startup event may comprise a restart event in some implementations. In response to the startup event, applications 740-742 are initiated on the controller to identify any changes required to the data plane in virtual switch 720. Once initiated, master configuration application 740, which may be responsible for configuring flow operations or flow tables in virtual switch 720, may notify, at step 2, configuration applications 741-742 of its dependency on their operations. These notifications ensure that each of configuration applications 741-742 notify master configuration application 740 when operations of the applications are complete. Prior to receiving the notifications, master configuration application 740 may pause, at step 3, the configuration operations until the required information is determined by configuration applications 741-742. In some implementations, configuration applications 741-742 may be responsible for identifying a current configuration for virtual switch 720 and determine any switches that need to be joined for the virtual switch to provide appropriate interconnects for virtual machines 710-712.

Once configuration applications 741-742 provide the required operations, the configuration applications may provide, at step 4, notifications indicating the completion of their operations. After receiving the notification, master configuration application 740 may return, at step 5, to the configuration operations for virtual switch 720. In some examples, as described herein, master configuration application 740 may be responsible for configuring the data plane for virtual switch 720. Consequently, master configuration application 740 may be required to identify a current configuration for virtual switch 720, and a run-time configuration for virtual switch 720. This run-time configuration may be determined at least in part by information provided from a central controller which manages the local controllers for a plurality of virtual switches in a computing environment. In configuring the data plane, master configuration application 740 may be configured to identify flow operations or flow tables that are currently being implemented by virtual switch 720. These flow operations may be compared to flow operations determined from the run-time configuration from the central controller to determine changes that are required in the virtual switch. Thus, instead of writing a new configuration, master configuration application 740 may be responsible for only writing the differences between the current state and the desired run-time state. However, it should be understood that instead of writing the differences, master configuration application 740 may be responsible for writing a new configuration in some example based on the run-time information from the central controller.

In at least one example, the run-time state provided by the central controller may identify configuration information for the entire routing plane across multiple virtual switches. As a result, controller 725 may be required to determine, which portions of the run-time configuration apply to virtual switch 720, and implement a configuration based on the identified portions.

After receiving the notifications from configuration applications 741-741, master configuration application 740 may return or resume, at step 5, the configuration operations of the master configuration application. As described herein, these configuration operations may rely on information obtained or identified by configuration applications 741-742. This information may include information about switch configurations, router configurations, or any other similar configuration information. Further, the information may include run-time configuration information determined from a central controller for the computing environment. Based on the information from the other configuration applications, master configuration application 740 may determine changes to be made to virtual switch 720 and, at step 6, configure virtual switch 720. This configuration may include adding new flow operations, removing flow operations, modifying flow operations, or some other similar flow operation action.

Figure 8:
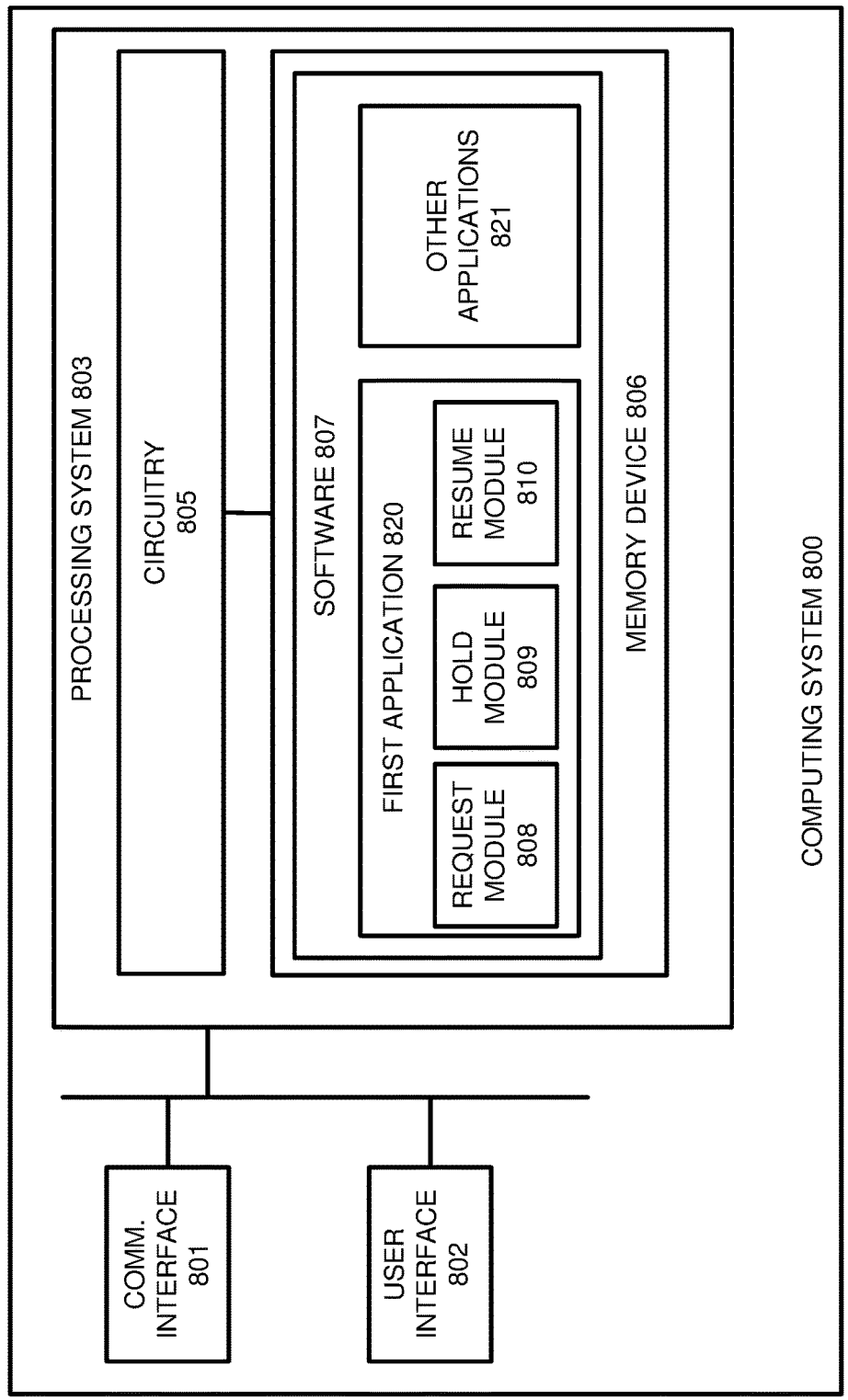
FIG. 8 illustrates a computing system to implement a virtual switch controller according to an implementation.

FIG. 8 illustrates a computing system to implement a virtual switch controller according to an implementation. Computing system 800 is representative of any computing system or systems with which the various operational architectures, processes, scenarios, and sequences disclosed herein for configuring a virtual switch may be implemented. Computing system 800 is an example of a computing system for implementing controllers 125 and 725, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes first application 820 with request module 808, hold module 809, and resume module 810, and further includes other applications 821, although any number of software modules within the application may provide the same operation. Operating software 807 may further include an operating system, utilities, drivers, network interfaces, applications, or some other type of software. When executed by processing circuitry 805, operating software 807 directs processing system 803 to operate computing system 800 as described herein.

In at least an implementation, first application 820 and other applications 821 may be initiated in response to a startup event for the virtual switch controller. Once initiated, request module 808 on first application 820 may, when executed by processing system 803, register with one or more applications in other applications 821. This registration permits first application 820 to receive notifications from applications which it depends. For example, first application 820 may require other applications to identify a current configuration of a virtual switch before a new configuration can be implemented. Once the notifications are transferred, hold module 809 may direct first application 820 to hold configuration operations until the notifications are received from the other applications. In some implementations, the holding of first application 820 may occur prior to any operations for the first application. In other implementations, first application 820 may complete at least a portion of its operations while waiting for the notifications.

After holding the configuration operations of first application 820, resume module 810 directs processing system 803 to receive notifications from the one or more applications and, in response to receiving the notifications, resume the configuration operations of first application 820. In some examples, first application 820 may not have any dependencies, such as when first application 820 is responsible for configuring the flow operations in the virtual switch. In other examples, first application 820 may be required to transfer notifications to other applications indicating that the first application completed its operations. These notifications may be transferred to applications based on whether a registration notification was received from the other applications.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer implemented method of operating a virtual switch controller to configure a virtual switch, the virtual switch controller comprising a plurality of applications, the method comprising:
   during a startup event, initiating on the virtual switch controller the plurality of applications to configure the virtual switch for a plurality of computing nodes;
   in a first application of the plurality of applications, pausing, by a configuration application of the first application, execution of the first application until one or more completion notifications are received from one or more other applications in the plurality of applications;
   in the first application, receiving from the one or more other applications the one or more completion notifications;
   in the first application and in response to receiving the one or more completion notifications, resuming, by the configuration application of the first application, the first application to configure the virtual switch for the plurality of computing nodes.

2. The method of claim 1 further comprising, in the first application, registering with the one or more other applications to receive the one or more completion notifications.

3. The method of claim 1 wherein the first application comprises a master configuration application, and wherein resuming the first application to configure the virtual switch for the plurality of computing nodes comprises configuring a data plane for the plurality of computing nodes.

4. The method of claim 3 further comprising, in the first application, receiving a run-time configuration for the data plane, and wherein configuring the data plane for the plurality of computing nodes comprises configuring the data plane for the plurality of computing nodes based on the run-time configuration.

5. The method of claim 4 further comprising, in the first application, identifying a current configuration for the data plane, and wherein configuring the data plane for the plurality of computing nodes based on the run-time configuration comprises: identifying differences between the run-time configuration and the current configuration; and configuring the data plane for the plurality of computing nodes using the identified differences.

6. The method of claim 1 wherein initiating the plurality of applications occurs in response to a startup of the virtual switch controller.

7. The method of claim 1 wherein initiating the plurality of applications occurs in response to a restart of the virtual switch controller.

8. The method of claim 1 further comprising: in the first application, receiving registration notifications from one or more dependent applications; in the first application, identifying a completion of configuration operations by the first application; and in the first application and in response to identifying the completion, notifying the one or more dependent applications of the completion.

9. A computer apparatus comprising:
one or more non-transitory computer readable storage media;
a processing system operatively coupled with the one or more non-transitory computer readable storage media; and
program instructions stored on the one or more non-transitory computer readable storage media to operate as a virtual switch controller comprising a plurality of applications to program a data plane of a virtual switch that, when read and executed by the processing system, direct the processing system to at least:
during a startup event, initiate on the virtual switch controller the plurality of applications to configure the virtual switch for a plurality of computing nodes;
in a first application of the plurality of applications, pausing, by a configuration application of the first application, execution of the first application until one or more completion notifications are received from one or more other applications in the plurality of applications;
in the first application, receive from the one or more other applications the one or more completion notifications; in the first application and in response to receiving the one or more completion notifications, resuming, by the configuration application of the first application, the first application to configure the virtual switch for the plurality of computing nodes.

10. The computer apparatus of claim 9 wherein the program instructions further direct the processing system to, in the first application, register with the one or more other applications to receive the one or more completion notifications.

11. The computer apparatus of claim 9 wherein the first application comprises a master configuration application, and wherein the program instructions to resume the first application to configure the virtual switch for the plurality of computing nodes direct the processing system to configure a data plane for the plurality of computing nodes.

12. The computer apparatus of claim 11 wherein the program instructions further direct the processing system to, in the first application, receive a run-time configuration for the data plane, and wherein the program instructions to configure the data plane for the plurality of computing nodes direct the processing system to configure the data plane for the plurality of computing nodes based on the run-time configuration.

13. The computer apparatus of claim 12 wherein the program instructions further direct the processing system to, in the first application, identify a current configuration for the data plane, and wherein the program instructions to configure the data plane for the plurality of computing nodes based on the run-time configuration direct the processing system to: identify differences between the run-time configuration and the current configuration; and configure the data plane for the plurality of computing nodes using the identified differences.

14. The computer apparatus of claim 9 wherein the program instructions to initiate the plurality of applications direct the processing system to initiate the plurality of applications in response to a startup of the virtual switch controller.

15. The computer apparatus of claim 9 wherein the program instructions to initiate the plurality of applications direct the processing system to initiate the plurality of applications in response to a restart of the virtual switch controller.

16. The computer apparatus of claim 9 wherein the program instructions further direct the processing system to: in the first application, receive registration notifications from one or more dependent applications; in the first application, identify a completion of configuration operations by the first application; and in the first application and in response to identifying the completion, notifying the one or more dependent applications of the completion.

17. An apparatus comprising:
one or more non-transitory computer readable storage media; and
program instructions stored on the one or more non-transitory computer readable storage media to operate as a virtual switch controller comprising a plurality of applications to program a data plane of a virtual switch that, when read and executed by a processing system, direct the processing system to at least:
during a startup event, initiate on the virtual switch controller the plurality of applications to configure the virtual switch for a plurality of computing nodes;
in a first application of the plurality of applications, pausing, by a configuration application of the first application, execution of the first application until one or more completion notifications are received from one or more other applications in the plurality of applications;
in the first application, receive from the one or more other applications the one or more completion notifications;
in the first application and in response to receiving the one or more completion notifications, resume, by the configuration application of the first application, the first application to configure the virtual switch for the plurality of computing nodes.

18. The apparatus of claim 17 wherein the program instructions further direct the processing system to, in the first application, register with the one or more other applications to receive the one or more completion notifications.

19. The apparatus of claim 17 wherein the first application comprises a master configuration application, wherein the program instructions further direct the processing system to receive a run-time configuration for the data plane from a central controller for a plurality of virtual switches, and wherein the program instructions to resume the first application to configure the virtual switch for the plurality of computing nodes direct the processing system to resume the first application to configure a data plane for the plurality of computing nodes based on the runtime configuration.

20. The apparatus of claim 19 wherein the program instructions further direct the processing system to, in the first application, identify a current configuration for the data plane, and wherein the program instructions to configure the data plane for the plurality of computing nodes based on the run-time configuration direct the processing system to: identify differences between the run-time configuration and the current configuration; and configure the data plane for the plurality of computing nodes using the identified differences.

* * * * *